(No Model.)
C. J. GIBSON.
LAWN MOWER.
No. 263,506. Patented Aug. 29, 1882.
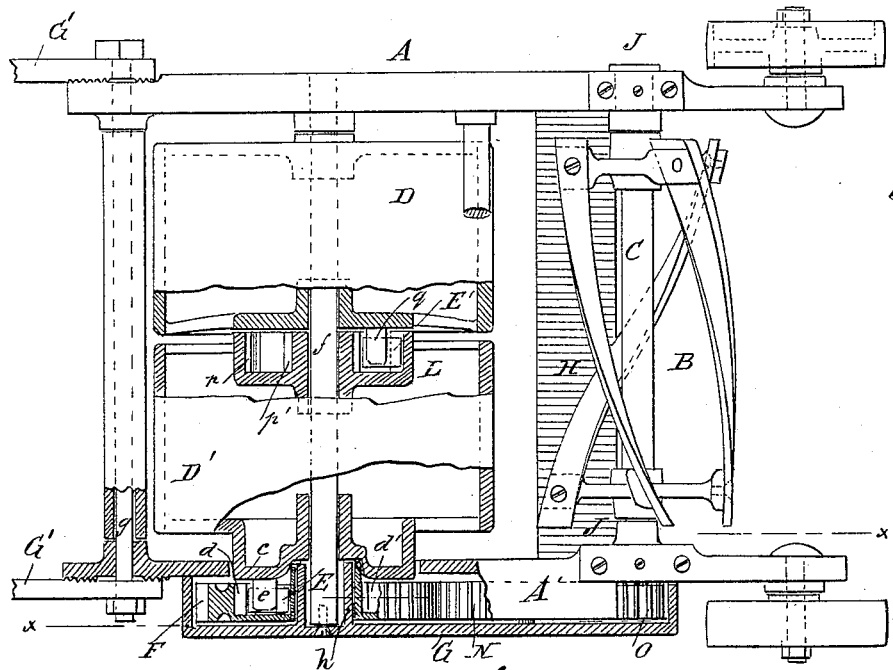
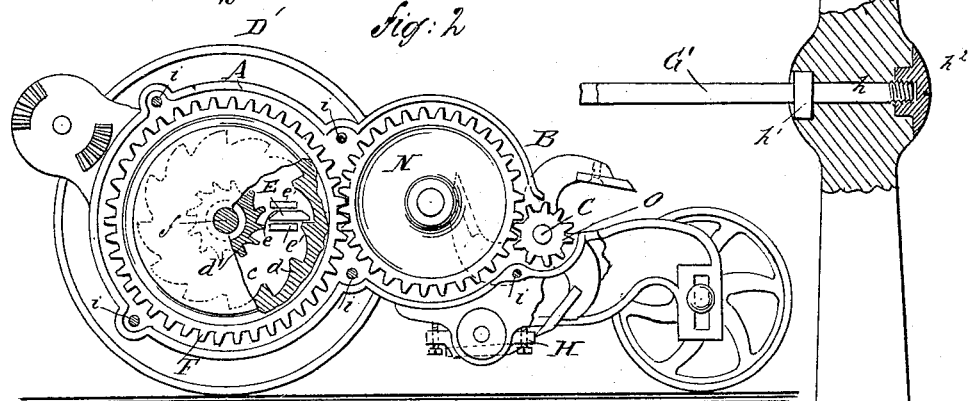
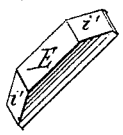
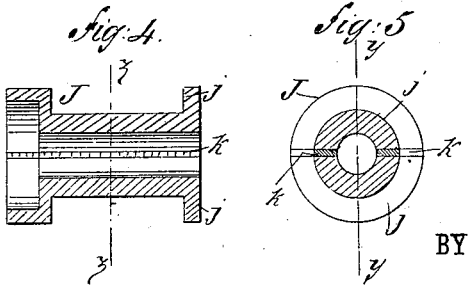
WITNESSES:
Chas. Nida
C. Sedgwick
INVENTOR:
C. J. Gibson
BY Munn & Co
ATTORNEYS.

UNITED STATES PATENT OFFICE.

CHARLES J. GIBSON, OF BERGEN POINT, NEW JERSEY, ASSIGNOR TO CARR & HOBSON, (LIMITED,) OF NEW YORK, N. Y.

LAWN-MOWER.

SPECIFICATION forming part of Letters Patent No. 263,506, dated August 29, 1882.

Application filed March 23, 1882. (No model.)

*To all whom it may concern:*

Be it known that I, CHARLES J. GIBSON, of Bergen Point, in the county of Hudson and State of New Jersey, have invented a new and Improved Lawn-Mower, of which the following is a full, clear, and exact description.

My invention relates to an improvement in that class of lawn-mowers having spirally-arranged cutters revolving about a horizontal axis; and it consists in the peculiar construction of the mechanism for driving said cutters and its arrangement with respect to the frame, as will be hereinafter more fully described.

Reference is to be had to the accompanying drawings, forming a part of this specification, in which similar letters of reference indicate corresponding parts in all the figures.

Figure 1 is a partial sectional plan view of a lawn-mower made in accordance with my invention. Fig. 2 is a sectional elevation of the same, taken on the line $x\,x$ of Fig. 1. Fig. 3 is a perspective of the clutch or dog removed from the machine. Fig. 4 is a sectional elevation of the journal-box, taken on the line $y\,y$ of Fig. 5. Fig. 5 is a similar view of the box, taken on the line $z\,z$ of Fig. 4; and Fig. 6 is a detailed partial sectional plan view of the handle and handle-bars of my improved lawn-mower.

The side pieces, A A', of the frame of the machine, the revolving cutter B and its shaft C, and the stationary knife H are of the ordinary form and construction, and the driving drums or wheels D D', are placed loosely upon the axle $f$ in the ordinary manner, and the side plate, G, which is secured by the screw-bolts $i\,i$ to the outside of the side plate, A', for inclosing the gear-wheels, is formed with the hollow boss $h$, which receives the end of the axle $f$ and forms the journal for the main cog-wheel F in the ordinary manner.

E is the clutch-block or dog, which locks the driving drum or wheel D' to the main cog-wheel F upon the forward movement of the machine, but disengages the said cog-wheel and permits the free movement of the said drum or wheel D' upon the backward movement of the machine; and this dog or block is carried in the way $e$, forward in this instance, by the lips $e'\,e'$, cast upon the head $c$ of the drum or wheel D', and is made positively acting by the formation and relative position of the concentric ratchets $d\,d'$, formed upon the inner face of the said main cog-wheel F, with which ratchets the dog or clutch-block E engages for locking the drum and said cog-wheel together. The side frame, A', is perforated about the axle $f$ to allow the head $c$ of drum D' to protrude through, and thus bring the dog E into the plane of wheel F. The dog or clutch-block E is a plain block of steel beveled off at its ends, as shown at $i'\,i'$ in Fig. 3, and is of a length a little greater than the distance the teeth of the ratchet $d$ are from those of the ratchet $d'$, and the teeth of the said ratchets are so made that their square or right-lined faces come on the same side of the teeth in both the outer ratchets, $d$, and inner ratchets, $d'$, but are upon different radii of the cog-wheel, so that the inclined rear faces of the teeth of the ratchets, when the machine has backward movement, act alternately, like cams, upon the beveled ends of the dog E and move it from side to side in the way $e$, thus causing it to slide past the teeth of the ratchets, leaving the drive wheel or drum D' and the cog-wheel F free to turn in opposite directions, or the driving-drum to remain at rest and the cog-wheel to revolve. This side-to-side movement of the dog E also keeps it at all times in position for engagement with the square face of the teeth of one ratchet or the other upon the reverse or forward movement of the machine.

G' G' are the handle-bars of the mower, which are of metal and secured to the side plates, A A', by the rod $g$ in the ordinary manner, and G² is the wooden handle. The outer ends of the handle-bars G' are formed with the shank $h^3$, upon which the handle G² is placed, and at the lower part of the shank is formed the shoulder $h'$, against which the handle G² rests, as shown in Fig. 6. The outer ends of the shanks $h^3$ are screw-threaded, and adapted to receive the rounded screw-cap $h^2$ for securing the handle in place upon the shanks and for adapting the handle to be removed from the handle-bars when desired.

J J represent the journal-boxes of the cutter-shaft C, which are made of the two segments $j\,j$, which are adapted to have the strips $k\,k$, of wood, rubber, or other similar material, placed between them, as shown in Figs. 4 and 5, which will permit the parts $jj$ of the boxes to be adjusted for taking up the wear of the boxes and shaft.

It will be understood that although I have shown in the drawings my invention applied to a mower having two driving wheels or drums, the invention thus far described is applicable as well to mowers having but one driving wheel or drum. In case two drums are used, as in the drawings, the inner side face of the drum D′ will be recessed, as shown at L in Fig. 1, and in this recess will be formed the concentric ratchets $pp'$, precisely similar in construction to the ratchets $dd'$, already described, and the adjacent face of the drum D will be formed with the lips $q$ for holding the dog or clutch-block E′, which serves to lock the drums D D′ together upon the forward movement of the machine, and to permit independent backward movement of the same, as in the case of the drum D′ and cog-wheel F, fully described above. The forward movement of the main cog-wheel F is communicated to the cutting-shaft C through the cog-wheels N and O in the ordinary manner.

With respect to the positively-acting clutch, I would state that I have made it the subject-matter of a separate application, and I therefore only claim it in its special combination with the coacting parts of the lawn-mower as specially adapted to receive it, and which embodiment of the clutch in the lawn-mower not only avoids the use of all springs, but causes the cutting-blades of the mower to respond quickly to the forward movement of the machine.

Having thus described my invention, I claim as new and desire to secure by Letters Patent—

1. The combination, in a lawn-mower, of the axle $f$, the drum D′, having head $c$, carrying ways $ee'$ and dog E, the wheel F, having the double set of ratchet-teeth $d$ and $d'$, the side frame, A′, having an opening to receive head $c$, and located between the wheel F and the drum D′, the outer case G, having sleeve $h$, the cutter, and the connecting-gears, substantially as shown and described.

2. The combination, in a lawn-mower, of the shaft or axis $f$, the loose drum D, having ways $q$ and dog E′, and the loose drum D′, having recess L, with teeth $pp'$, substantially as shown and described.

CHARLES J. GIBSON.

Witnesses:
H. A. WEST,
C. SEDGWICK.